Nov. 3, 1936.  J. EGGERT ET AL  2,059,323
COLOR PHOTOGRAPHY
Filed March 27, 1934
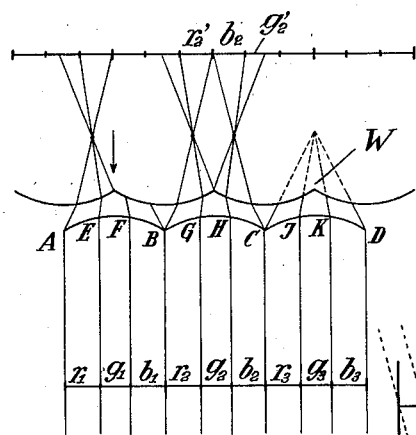
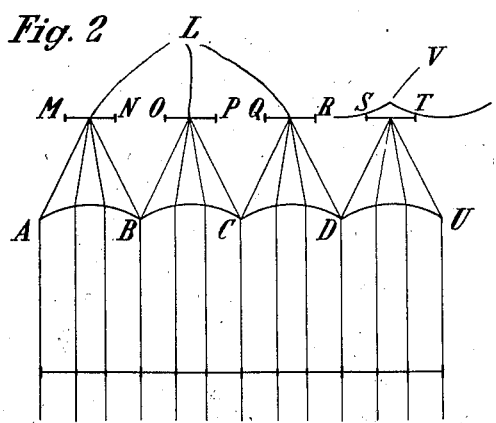
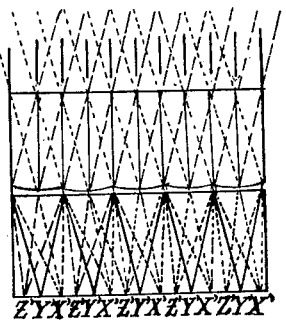
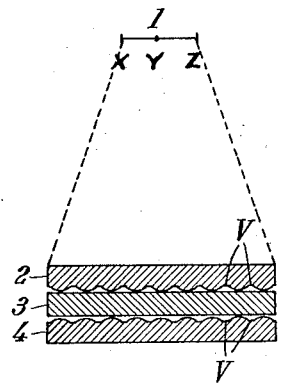
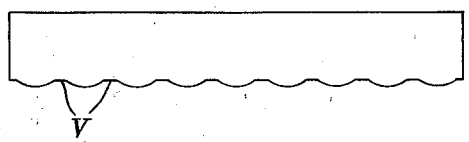
Inventors:-
John Eggert.
Gerd Heymer,
by Potter, Pierce & Scheffler.
Attorneys.

UNITED STATES PATENT OFFICE 2,059,323

COLOR PHOTOGRAPHY

John Eggert, Leipzig-Gohlis, and Gerd Heymer, Wolfen Krs. Bitterfeld, Germany, assignors to I. G. Farbenindustrie Aktiengesellschaft, Frankfort-on-the-Main, Germany Application March 27, 1934, Serial No. 717,672
In Germany March 29, 1933

4 Claims. (Cl. 95—75)

Our present invention relates to color photography and more particularly to color photography making use of lenticular film.

One of its objects is to provide an improved process for printing an original taken on lenticular film on to lenticular film. Another object is an arrangement for printing according to this process. Further objects will be seen from the detailed specification following hereafter. Reference is made to the accompanying drawing in which Fig. 1 shows the defects occurring in contact printing lenticular film with the lenticular embossings facing each other, Fig. 2 shows how to avoid these defects, Fig. 3 shows diagrammatically a lenticular film with deformed places at the point of contact, Fig. 4 shows diagrammatically an arrangement for printing according to this invention, and Fig. 5 shows the course of the rays coming from the source of light for the original and the intermediate film.

In printing a lenticular film on to another lenticular film, the two films having their lenticular elements in contact with each other, there is often produced streakiness which impairs the reproduction. This streakiness is caused by the fact that narrow pencils of light emanate from the strips corresponding with the several partial color pictures in the layer behind each lenticular element for instance, the strips $r_1$, $g_1$, $b_1$; $r_2$, $g_2$, $b_2$; $r_3$, $g_3$ and $b_3$ of Fig. 1 emerge through the embossed side of the original film in the breadth AE, EF, FB; BG, GH, HC; CI, IK, KD. These pencils of light strike the lenticular elements of the printing film either in the middle of each lenticular element or at the places of junction of two lenticular elements, for instance, at W the pencil of light coming from $g_3$ and leaving the lenticular element in the breadth IK strikes such a junction. Because of the optical properties of these lenticular elements, however, it is not immaterial, whether in reproducing the picture the light passes through the middle or through the margin of a lenticular element. For instance, if the original and the film to be printed are at an angle to one another as it is practically unavoidable, the points at which the middle of the element is struck periodically alter with those in which the pencil of light falls on the junction of the lenticular elements which junctions are in practice always deformed (see Fig. 3 the places V), so that the points are not at all reproduced or reproduced only in a distorted form. For instance, in Fig. 1 the pencils coming from $g_1$, $g_2$ and $g_3$ are projected on such positions and are not copied in the correct places so that in the print the green part color picture of the elements of the original is omitted. As in practice the characteristics of the lenticular elements vary slightly there are omitted from point to point different part color pictures. The periodical omission of colors due to this fact is called "moire."

If in Fig. 1 the printing film is omitted as shown in Fig. 2 it will be found that the source of light which serves for illuminating the original is copied at a certain distance from the lenticular elements of the original which is equal to the focal length of the lenticular elements. In the focal points L (cf. Fig. 2) all the rays are united which have passed through the original, and the rays belonging to the different fundamental colors can only be recognized by the direction from which they are coming and which is characteristic for each color. If, therefore, a lenticular film is arranged at focal distance from the original an image of the source of light would now again be projected on a lenticular element or on the place of junction of two adjacent lenticular elements. However, it can no longer happen that only one color is omitted and all the colors are always omitted to the same amount. Therefore, the defect in the reproduction of the colors caused by the places of junction is no longer manifest by the periodic omission of one color and therefore by a streakiness, but by a periodic fluctuation of the depth of the colors in reproduction which is the same for all the colors but to which the human eye is not nearly as sensitive as it is to the predominance of one color. The same considerations hold true if the source of light and in consequence the images of the source of light receives a somewhat greater extension, so that the images are not punctiform, but correspond, for instance, with the breadth MN, OP, QR and ST. In this manner the ratio between the portion of the light rays which is lost on account of the disturbance in printing caused by the places of junction V between two lenticular elements and the portion of the light rays which add to the print is ameliorated.

If there is another medium than air between the two films the distance must be changed in accordance with the refracting index of the material because the distance of the focal point will be changed by the insertion of a material having a refracting index different from that of air. If a film of the usual material is inserted between the original and the printing film the thickness of that film is about the same as that of the original with the difference that obviously this film has no lenticular elements. In any case the thickness of the material must be so selected that the image of the source of light projected by the lenticular elements of the printing film is received on the embossed surface of the printing film.

Furthermore, it is advantageous to effect the illumination with parallel light or light as parallel as possible. Owing to the spacing of the two films, moiré effects can be eliminated also when pencils of light are not used and without displacing the films laterally during the printing operation. A particular advantage of the process lies in the fact that the relative position of the films need not be altered during the printing operation.

Fig. 4 shows diagrammatically an arrangement for printing by the method of this invention. Referring to this figure, 1 is the source of light having such a breadth that it is projected by the lenticular elements of the original 2 at focal distance in a breadth at most equal to the breadth of one lenticular element and greater than the breadth of the deformed junction V of two adjacent lenticular elements 4 is the printing film with its lenticular elements facing those of the original. Between the original and the printing film there is arranged the film 3 of the composition usual for photographic films and of such thickness that the surface of the printing film in contact with the film 3 is located at focal distance from the lenticular elements of the original 2 likewise in contact with the film 3.

In Fig. 5 there is shown the course of the rays coming from the source of light (not shown) for the original and the intermediate film, for the middle of the source of light and both ends, that is to say for the points X, Y and Z of Fig. 4. The full lines show the course of the rays for the point Y, the dotted lines the course of the rays for point X, and the dashed lines the course of the rays for point Z.

What we claim is:
1. In the printing of lenticular film on lenticular film the method of preventing moiré effects which consists in positioning the original film and the printing film with their lenticulated faces opposed to and parallel with each other and spaced apart by a transparent substance, and illuminating the printing film through the original film and the spacing transparent substance by means of a light source emanating parallel light, the transparent substance having such a relation between thickness and refractive index that a real image of the light source is produced in the plane of the lenticulations of the printing film said real image having a breadth greater than that of the deformed part of the junction between two adjacent lenticular elements and at most equal to the breadth of one lenticular element.

2. Method defined in claim 1, in which the spacing transparent substance is a sheet of transparent material having smooth parallel sides which contact the respective lenticulated faces of the original and printing films, the thickness of the sheet being proportioned to its index of refraction to produce the real image defined in claim 1.

3. Method defined in claim 1, in which the spacing transparent substance is a sheet of smooth and parallel surfaced film formed of the same material as was the original film and having substantially the latter's thickness, the lenticulated faces of the original film and of the printing film, respectively, contacting the surfaces of the spacing film.

4. Method defined in claim 1, in which the spacing transparent substance is air, the printing film being positioned at such a point that its lenticulations lie in the plane of the real image created by the lenticulations of the original film.

JOHN EGGERT.
GERD HEYMER.